May 18, 1926.
A. F. FALEY
1,585,475
DRILLING AND FISHING JAR
Filed Oct. 21, 1924
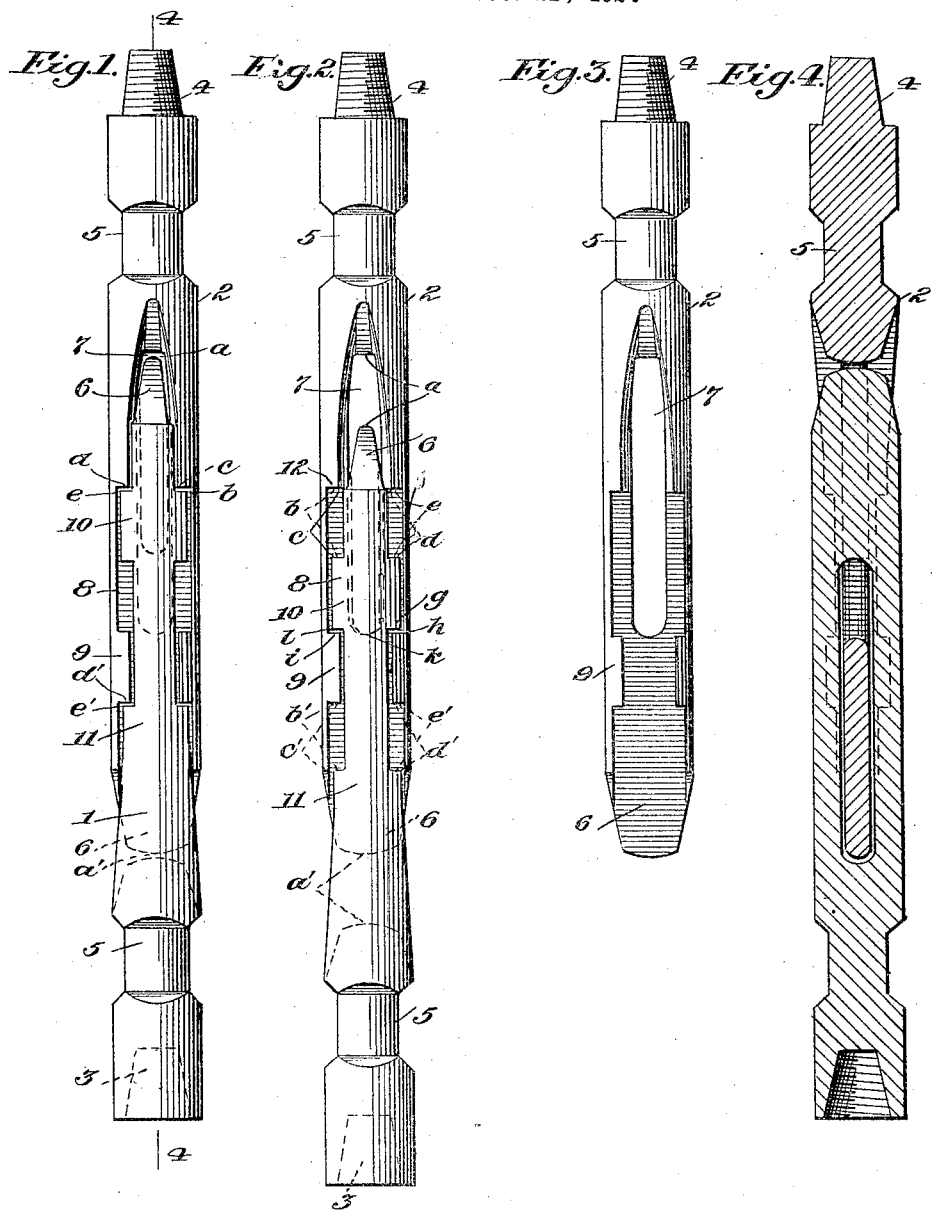

Patented May 18, 1926.

1,585,475

UNITED STATES PATENT OFFICE.

AUGUST F. FALEY, OF TULSA, OKLAHOMA.

DRILLING AND FISHING JAR.

Application filed October 21, 1924. Serial No. 744,974.

This invention relates to drilling and fishing jars and the object of my invention is to provide a jar that is strong in construction and efficient in operation.

Another object of my invention is to provide a drilling and fishing jar in which the jar is kept straight during the up and down operation and side motion of the sections is prevented.

Another object of the my invention is to provide a drilling and fishing jar having a plurality of wearing surfaces which serve as knocker heads.

I accomplish the above and other objects of the invention by means of the device shown in the accompanying drawings in which—

Figure 1 is a side view of the jar with the sections shown in closed position;

Fig. 2 is a view similar to Fig. 1 showing the jar sections in open position;

Fig. 3 is an elevation of the upper jar section; and Fig. 4 is a longitudinal section taken on the line 4—4 of Fig. 1.

In the drawings, in which like reference characters indicate like parts on all the figures thereof, 1 indicates the lower jar section and 2 the upper jar section. The lower section 1 has the usual socket 3 for connection with the other elements of the drilling mechanism, and the upper section 2 is provided with a pin screw 4 for a similar purpose. 5 indicates the usual wrench square. 6 indicates the knocker heads which engage in the crotches 7 during the jarring operation.

The reins 8 on the section 2 are provided with internal lugs 9 and the lower section 1 is provided with similar external lugs 10.

The knocker heads 6 come into engagement with the crotch walls thus providing jaring surfaces $a$, $a'$, as is common in all drill constructions. The lugs 9 and 10 are adapted to engage lower and upper shoulders 11, 12, formed on the sections 1 and 2, respectively, thus providing additional jarring surfaces $b$, $b'$, $c$, $c'$, $d$, $d'$, $e$, $e'$, which also constitute knocker heads when the sections are in the closed position.

When the sections are in the open position the lugs 10 on the lower section come in contact with the opposite shoulders on the lugs 9 on the reins, thereby providing four jarring surfaces in this position, $l$, $g$, $h$, $i$. Other jarring surfaces are shown at $k$ which are common in constructions of this type.

It is apparent from the foregoing description that my improved drilling and fishing jar is provided with ten jarring surfaces when in the closed position and five jarring surfaces when the sections are separated or in their open position. With my improved construction the wear and strain is well distributed throughout the extent of the sections, whereby the useful life of the device is materially prolonged.

As the reins on a jar of this type are the weakest part of the construction, it is apparent that they are strengthened by the provision of lugs thereon.

Having thus described my invention, what I claim as new and desire to secure by Letters Patent is:

1. In a drilling and fishing jar, the combination of upper and lower sections, the upper section being provided with reins, lugs on the reins, the lower section being provided with shoulders adapted to engage with the lugs to provide a plurality of jarring surfaces, each of the sections being also provided with a knocker head and a crotch, the knocker head on one section cooperating with the crotch in the other section.

2. In a drilling and fishing jar, the combination of an upper and a lower section, reins on the upper section, lugs on the reins, lugs on the lower section, each of the sections being provided with shoulders, the lugs on one section engaging the lugs on the other section in one position of the jar, and the lugs on one section engaging the shoulders on the other section in another position of the jar.

3. A drilling and fishing jar comprising an upper and a lower section, a knocker at the lower end of the upper section, a plurality of reins on the upper section with a crotch therebetween, lugs on the reins providing upper and lower jarring surfaces, and a plurality of means on the lower section adapted to cooperate with the knocker head, the crotch and the jarring surfaces on the upper section.

4. A drilling and fishing jar comprising an upper section and a lower section, reins on the upper section having a crotch therebetween, a plurality of shoulders formed on the reins below the crotch, a lower section guided between said reins, said lower section having a knocker head adapted to cooperate with the reins at the crotch portion, and means on the lower section adapted to engage the shoulders.

5. In a drilling and fishing jar, the combination of two relatively movable sections, reins on one of said sections, shoulders formed on said reins, the other section being guided between said reins, said second named section having a plurality of shoulders thereon adapted to cooperate with the shoulders on the first named section, said sections having cooperating crotches and knocker heads.

In testimony whereof I affix my signature.

AUGUST F. FALEY.